US008578156B2

(12) United States Patent  
Goto

(10) Patent No.: US 8,578,156 B2  
(45) Date of Patent: Nov. 5, 2013

(54) DEVICE INCLUDING PROCESSOR AND ENCRYPTION CIRCUIT

(75) Inventor: Seiji Goto, Shinjuku (JP)

(73) Assignee: Fujitsu Semiconductor Limited, Yokohama (JP)

( * ) Notice: Subject to any disclaimer, the term of this patent is extended or adjusted under 35 U.S.C. 154(b) by 520 days.

(21) Appl. No.: 12/686,530

(22) Filed: Jan. 13, 2010

(65) Prior Publication Data

US 2010/0191982 A1   Jul. 29, 2010

(30) Foreign Application Priority Data

Jan. 26, 2009  (JP) ................................. 2009-014660

(51) Int. Cl.
*G06F 21/00*   (2013.01)
(52) U.S. Cl.
USPC ............................ 713/162; 713/192; 709/245
(58) Field of Classification Search
USPC .................... 713/162, 189–193; 709/245
See application file for complete search history.

(56) References Cited

U.S. PATENT DOCUMENTS

| | | | | |
|---|---|---|---|---|
| 5,563,945 | A * | 10/1996 | Gercekci .................... | 713/190 |
| 7,472,285 | B2 | 12/2008 | Graunke et al. | |
| 2003/0084308 | A1* | 5/2003 | Van Rijnswou ............. | 713/189 |
| 2003/0091187 | A1* | 5/2003 | Fontijn et al. ................ | 380/201 |
| 2003/0120941 | A1* | 6/2003 | Bae ............................ | 713/193 |
| 2005/0154912 | A1* | 7/2005 | Kim et al. ................... | 713/200 |
| 2005/0232415 | A1* | 10/2005 | Little et al. .................. | 380/28 |
| 2006/0015748 | A1 | 1/2006 | Goto et al. | |
| 2006/0224902 | A1* | 10/2006 | Bolt ............................ | 713/193 |
| 2007/0061595 | A1* | 3/2007 | Chen .......................... | 713/193 |
| 2008/0019524 | A1* | 1/2008 | Kim et al. ................... | 380/259 |
| 2008/0075279 | A1* | 3/2008 | Yoon et al. .................. | 380/44 |
| 2008/0205651 | A1 | 8/2008 | Goto et al. | |
| 2009/0083520 | A1* | 3/2009 | Kanemura .................. | 712/43 |
| 2010/0115286 | A1* | 5/2010 | Hawkes et al. ............. | 713/189 |

FOREIGN PATENT DOCUMENTS

| | | |
|---|---|---|
| JP | 2000-76144 A | 3/2000 |
| JP | 2005-505069 A | 2/2005 |
| JP | 2006-18528 A | 1/2006 |
| JP | 2006-526173 A | 11/2006 |
| JP | 2008-210225 | 9/2008 |

OTHER PUBLICATIONS

Japanese Office Action mailed Nov. 20, 2012 for corresponding Japanese Application No. 2009-014660, with Partial English-language Translation.

\* cited by examiner

*Primary Examiner* — Hadi Armouche
(74) *Attorney, Agent, or Firm* — Fujitsu Patent Center

(57) ABSTRACT

A device is provided which includes: a processor that outputs a command signal or an address signal and includes a bus module which inputs or outputs a data signal; and an encryption circuit that encrypts or decrypts the data signal in an encryption method using a common key and the address signal, wherein the processor and the encryption circuit are provided in a chip.

12 Claims, 14 Drawing Sheets

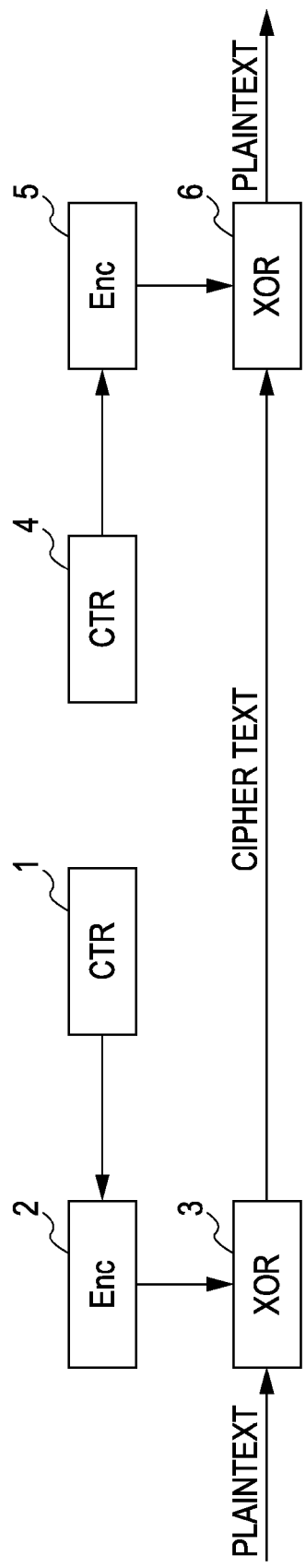

(12)  US 8,578,156 B2

DEVICE INCLUDING PROCESSOR AND ENCRYPTION CIRCUIT

CROSS-REFERENCE TO RELATED APPLICATIONS

This application claims the benefit of priority from Japanese Patent Application No. 2009-14660 filed on Jan. 26, 2009, the entire contents of which are incorporated herein by reference.

BACKGROUND

1. Field

The embodiments discussed herein relate to a processor that encrypts data.

2. Description of Related Art

A high-performance processor has a large scale of circuit and operates using a large-capacity memory. Thus, a large-capacity external memory may be implemented as another chip.

Related technologies are disclosed in, for example, Japanese Laid-open Patent Publication No. 2006-526173, Japanese Laid-open Patent Publication No. 2006-18528, and Japanese Laid-open Patent Publication No. 2008-210225.

SUMMARY

According to one aspect of the embodiments, a device is provided which includes: a processor that outputs a command signal or an address signal and includes a bus module which inputs or outputs a data signal; and an encryption circuit that encrypts or decrypts the data signal in an encryption method using a common key and the address signal, wherein the processor and the encryption circuit are provided in a chip.

Additional advantages and novel features of the invention will be set forth in part in the description that follows, and in part will become more apparent to those skilled in the art upon examination of the following or upon learning by practice of the invention.

BRIEF DESCRIPTION OF THE DRAWINGS

FIG. 1 illustrates an exemplary CTR mode encryption.

DESCRIPTION OF EMBODIMENTS

Figure 2A:
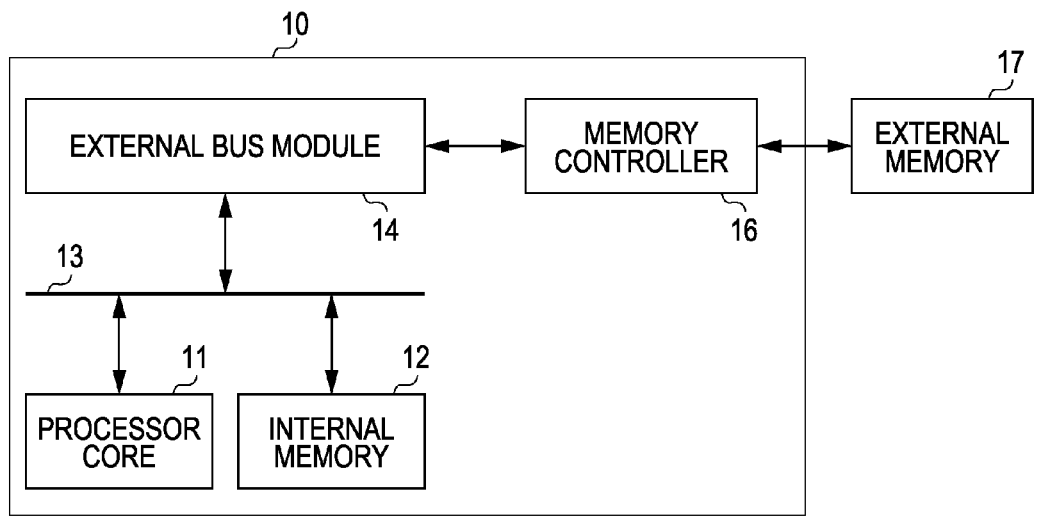
FIGS. 2A and 2B illustrate an exemplary processor.

An apparatus encrypts data outside a processor and protects access inside the processor. The apparatus may include, for example, a secure processor that makes it impossible to directly read data. Unencrypted data is used for internal processing of the secure processor.

When a large-capacity external memory is coupled to a secure processor, the secure processor encrypts output data in, for example, CTR mode and decrypts input data in CTR mode. A memory access time may increase due to encryption and decryption.

Data input and output to and from an external memory as a working memory is not encrypted and instead, data communicated via a communication line or data in a HDD or the like may be encrypted. Encrypted data may be decrypted by software processing before being stored in the external memory. A processor operates at high speed with respect to the external memory as a working memory.

The processor may be provided in the form of software and/or libraries and, for example, the processor may be incorporated into a one-chip semiconductor device. A one-chip semiconductor device may be made up of a processor as a bare chip and other circuit elements as the bare chip being mounted on one package.

It is desirable to ensure a high level of security in a semiconductor device such as a one-chip processor into which a processor that is not a secure processor is incorporated or a system on chip (SoC).

Common key encryption includes the ECB mode, CBC mode, CFB mode, OFB mode, CTR mode, and the like. The ECB mode and CTR (counter) mode may be suitable for memory access or random access by a processor. In ECB mode, one key is used for encryption so that there is a one-to-one correspondence between plaintext and cipher text. Encryption and decryption in ECB mode is simple. The ECB mode is relatively weak in encryption strength, for example, analysis resistance, due to pattern analysis of information that frequently appear in a processor such as 00 and FF. Thus, the CTR mode may be used for encryption for a random access memory.

FIG. 1 illustrates an exemplary CTR mode encryption. A CTR 1 generates a CTR address containing a memory access address and an arbitrary address. An Enc 2 outputs an encryption operation result based on a stored common key and the CTR address. An XOR 3 generates encrypted data by performing an exclusive OR (XOR) operation of unencrypted input data and the encryption operation result. The encrypted data may be stored in an external memory.

Processing of a CTR 4 and an Enc 5 when data is read from the external memory may be substantially the same as or similar to the processing of the CTR 1 and the Enc 2 when data is written to the external memory. Commonality of the CTR 1 and the CTR 4, and the Enc 2 and the Enc 5 each may be achieved. The exclusive OR (XOR) operation of encrypted input data read from the external memory with an encryption operation result output from the Enc 5 is performed by an XOR 6 to convert the encrypted input data into unencrypted input data before being supplied to a processor.

Figure 2B:
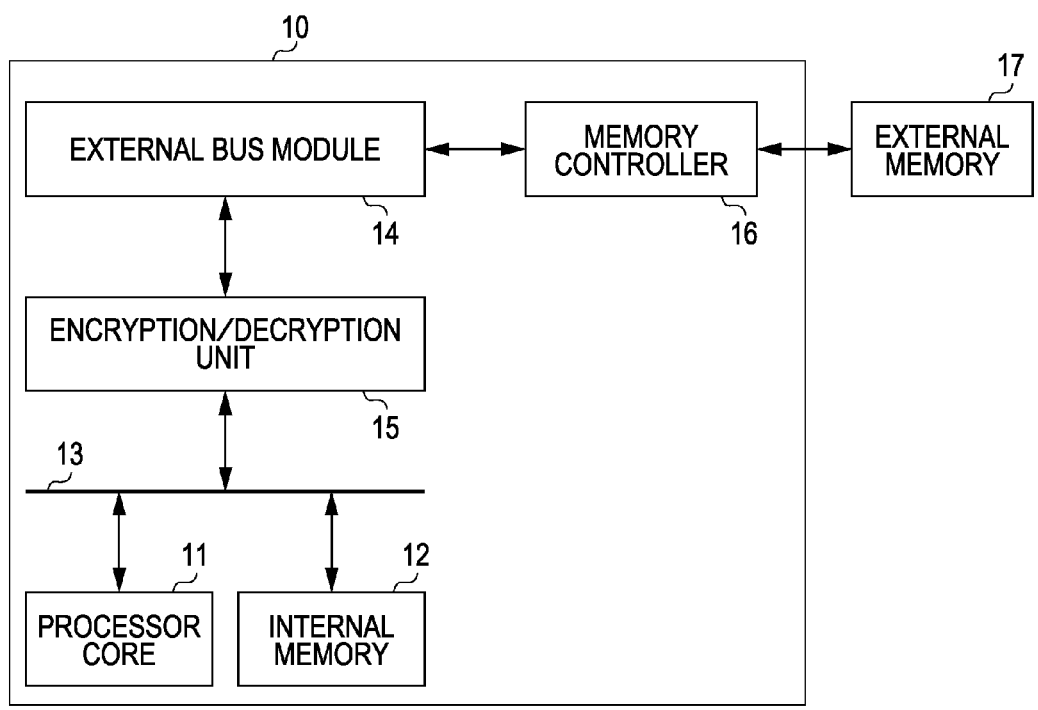

FIGS. 2A and 2B illustrate an exemplary processor. The processor illustrated in FIG. 2 is coupled to an external memory. In FIG. 2A, a processor 10 that does not contain an encryption function is coupled to an external memory interface. FIG. 2B illustrates a secure processor 10 including an encryption/decryption unit.

The processor illustrated in FIG. 2A includes a processor core 11, an internal memory 12, an internal bus 13, an external bus module 14, and a memory controller 16. These elements may be implemented, for example, in the same chip. An external memory 17 is coupled to the memory controller 16.

Figure 3:
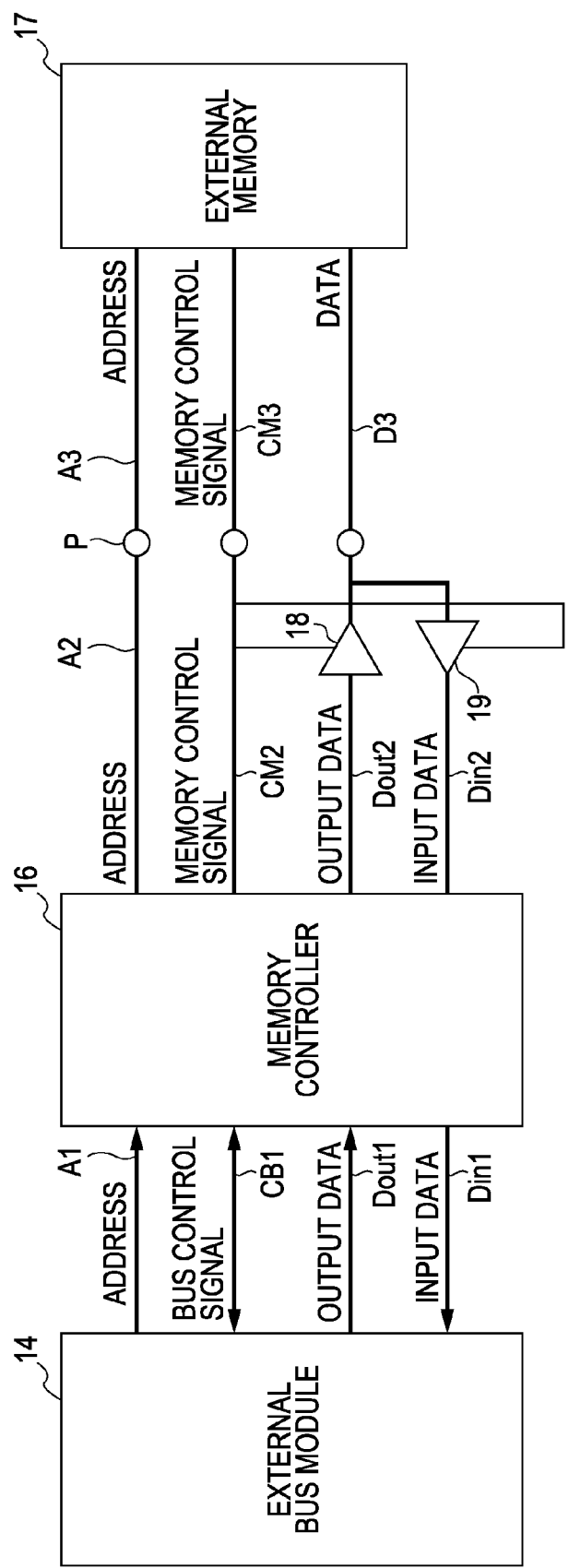
FIG. 3 illustrates an exemplary external bus module, an exemplary memory controller, and an exemplary external memory.

FIG. 3 illustrates an exemplary external bus module, an exemplary memory controller, and an exemplary external memory. The external bus module, memory controller, and external memory illustrated in FIG. 3 may be the external bus module 14, the memory controller 16, and the external memory 17 illustrated in FIG. 2A. The external bus module 14 and the memory controller 16 are coupled to an address signal A1, a bus control signal CB1, output data Dout1, or input data Din1 through a corresponding bus respectively. The memory controller 16 converts a signal into a control signal addressed to the external memory 17 in response to a request from the external bus module 14, and accesses memory using an address signal A2, a memory control signal CM2, output data Dout2, or input data Dint. The address signal A2, the memory control signal CM2, the output data Dout2, and the input data Dint on the left side of an external pin P of a chip correspond to an address A3, a memory control signal CM3, and data D3 on the right side of the external pin P respectively. Reference numeral 18 denotes an output buffer of the output data Dout2. Reference numeral 19 denotes an input buffer of the input data Dint. The output buffer 18 and the input buffer 19 are controlled by a read/write signal of the memory control signal CM2.

The external memory interface illustrated in FIG. 2A and FIG. 3 may be an ordinary external memory interface.

The secure processor illustrated in FIG. 2B includes an encryption/decryption unit 15 coupled to the internal bus 13. Other elements illustrated in FIG. 2B may be substantially the same or similar to those illustrated in FIG. 2A. The encryption/decryption unit 15 outputs encrypted data via the external bus module 14 and decrypts data input from the external bus module 14 to output the decrypted data to the internal bus 13. Connection among the external bus module 14, the memory controller 16, and the external memory 17 illustrated in FIG. 2B may be substantially the same as or similar to the connecting relationship illustrated in FIG. 2A and FIG. 3. In FIG. 2B, encrypted data is used outside the external bus module 14.

Figure 4:
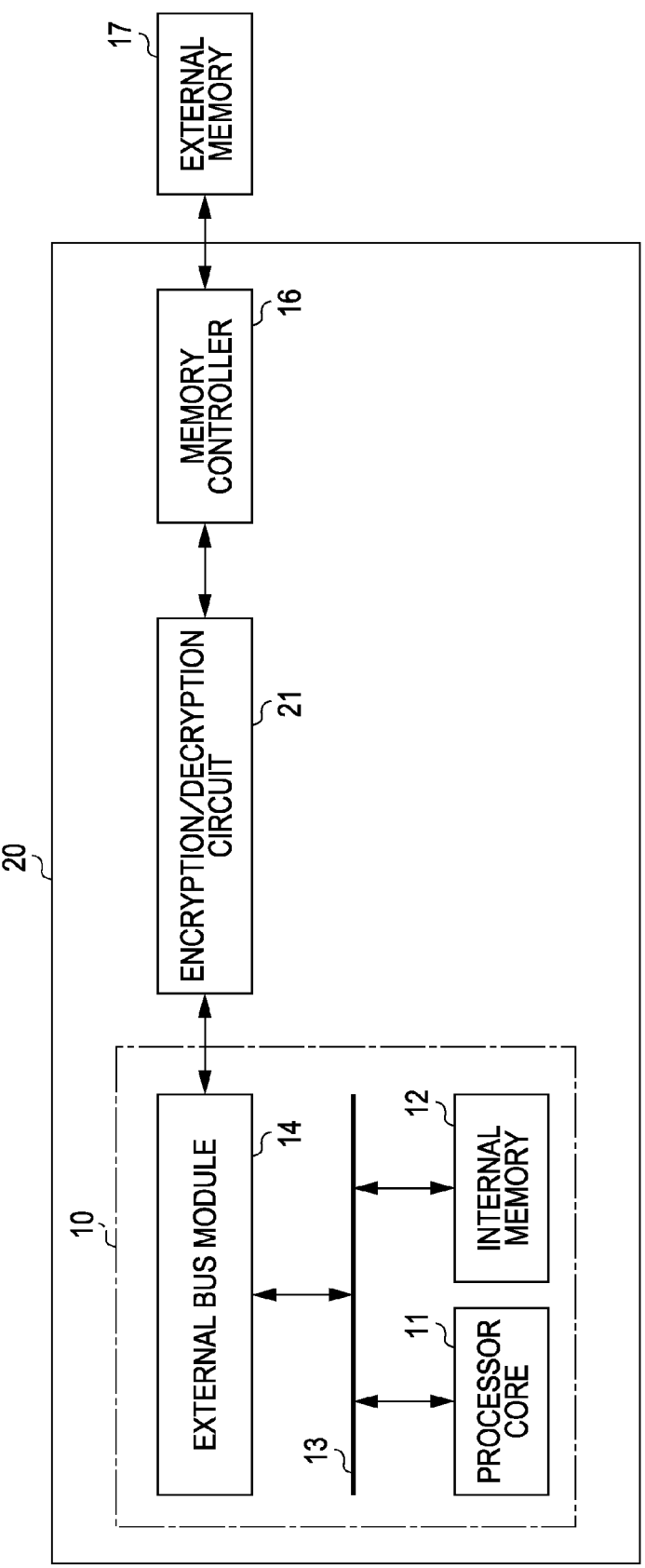
FIG. 4 illustrates an exemplary processor.

FIG. 4 illustrates an exemplary processor. A processor 20 illustrated in FIG. 4 may be coupled to the external memory 17. The processor 20 includes the processor core 11, the internal memory 12, the internal bus 13, the external bus module 14, the memory controller 16, and an encryption/decryption circuit 21 that are implemented inside a chip. The encryption/decryption circuit 21 is provided between the external bus module 14 and the memory controller 16.

Figure 5:
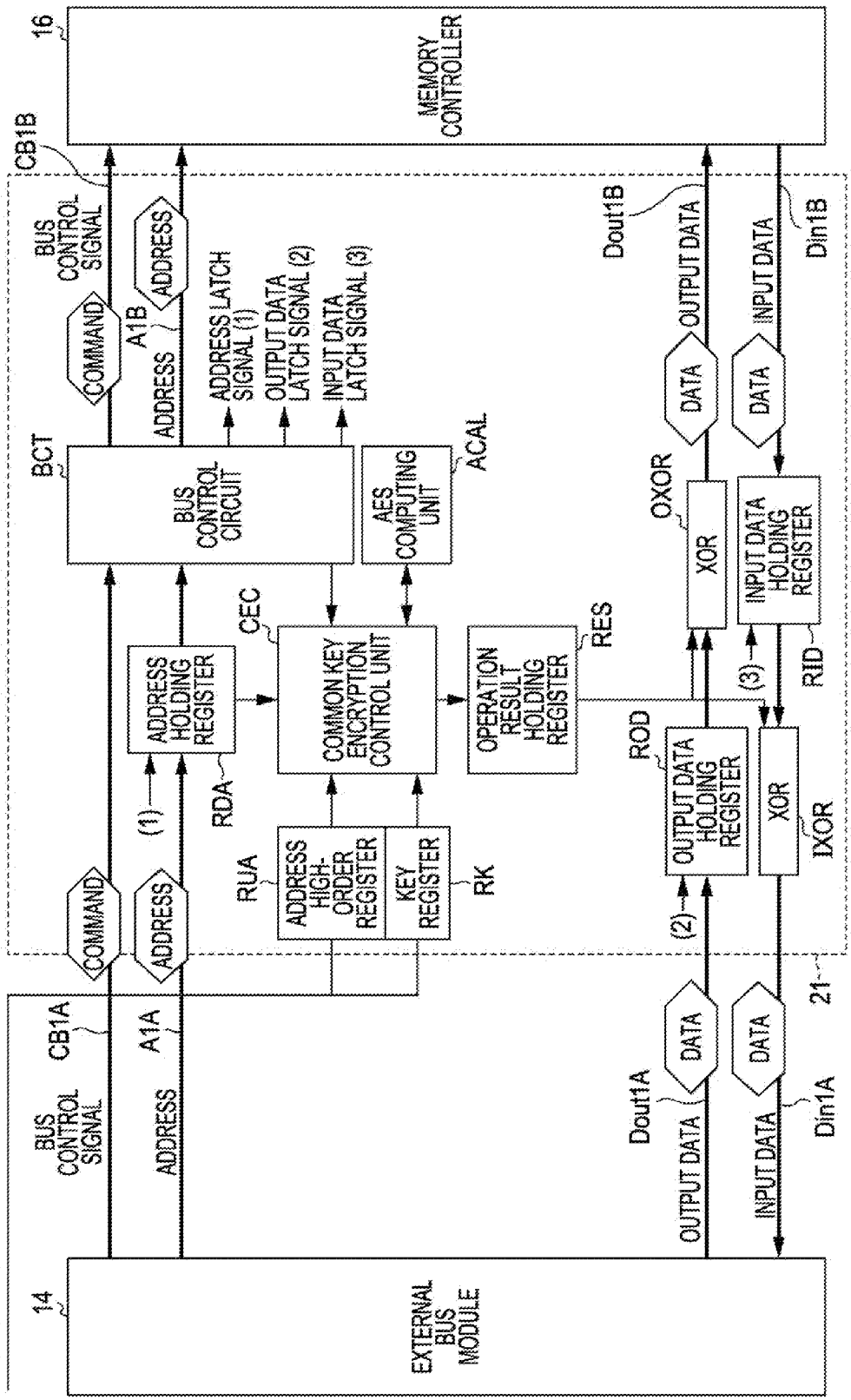
FIG. 5 illustrates an exemplary encryption/decryption circuit.

FIG. 5 illustrates an exemplary encryption/decryption circuit.

The encryption/decryption circuit illustrated in FIG. 5 includes a bus control circuit BCT, an address holding register RDA, an address high-order register RUA, a key register RK, a common key encryption control unit CEC, an AES computing unit ACAL, an operation result holding register RES, an output data holding register ROD, an output data XOR computing unit OXOR, an input data holding register RID, and an input data XOR computing unit IXOR.

The bus control circuit BCT generates an address latch signal (1), an output data latch signal (2), or an input data latch signal (3) based on bus control signals CB1A and CB1B. The bus control circuit BCT sends the bus control signal CB1B and an address A1B to the memory controller 16 after encryption. The address holding register RDA holds an address A1A in response to the address latch signal (1) and holds the address until encryption of the address is completed.

Values of the address high-order register RUA and the key register RK may be set in advance by software via a register dedicated bus. Any value may be set to the address high-order register RUA. The value set to the key register RK may be a cryptographic key in CTR mode. The common key encryption control unit CEC performs encryption in common key CTR mode. The value stored in the address high-order register RUA is set to a high-order section of the CTR counter and a memory access address held in the address holding register RDA is set to a low-order section of the counter. The value of the key register RK is used as a cryptographic key in CTR mode. The common key control unit CEC receives an address, for example, the address held in the address high-order register RUA or the address held in the address holding register RDA as an input, and performs common key encryption using the Advanced Encryption Standard (AES) computing unit ACAL with the cryptographic key as a key. An operation result is stored in the operation result holding register RES.

The output data holding register ROD holds output data Dout1A in response to an output data latch signal when data is written. The output data XOR computing unit OXOR outputs a value obtained by performing an XOR operation of the value of the output data Dout1A held in the output data holding register ROD and an encryption result as encryption write data Dout1B. The input data holding register RID holds input data Din1B in response to an input data latch signal when data is read. The input data XOR computing unit IXOR outputs a value obtained by performing an XOR operation of the value of the output data Din1B held in the input data holding register RID and an encryption result as decryption read data Din1A.

Figure 6:
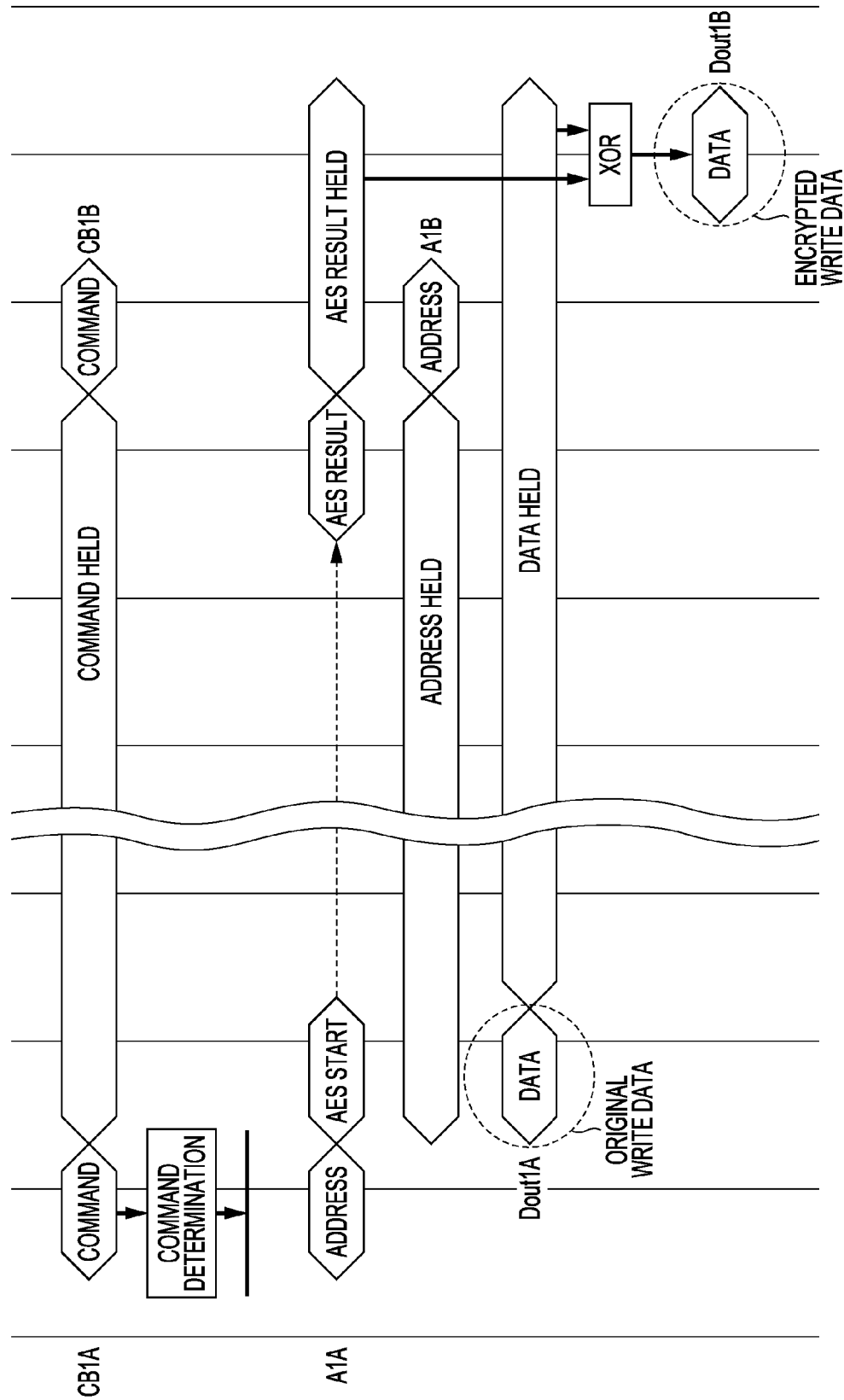
FIG. 6 illustrates an exemplary encryption.

FIG. 6 illustrates an exemplary encryption. The encryption illustrated in FIG. 6 may be performed by the encryption/decryption circuit illustrated in FIG. 5. The encryption illustrated in FIG. 6 may be performed in a memory write operation. A vertical line indicates an operation cycle. The bus control circuit BCT holds a command CB1A and determines the command as a write command. The address holding register RDA holds an address A1A in response to an address latch signal and inputs the address A1A into the common key encryption control unit CEC. The common key encryption control unit CEC performs encryption, for example AES processing, using the address A1A. It may take some time before an encryption result, for example an AES result, is obtained. The address holding register RDA holds the address A1A until an AES result is obtained. When AES processing is performed based on an output data latch signal, the output data holding register ROD holds the write data Dout1A before being processed. When the common key encryption control unit CEC completes processing, the operation result holding register RES holds the AES result. The bus control circuit BCT outputs a command and an address held by the bus control circuit BCT as a bus control signal CB1B and an address A1B respectively, and the output data XOR computing unit OXOR outputs a result of performing an XOR operation of the AES result and write data Dout1A as Dout1B.

Figure 7:
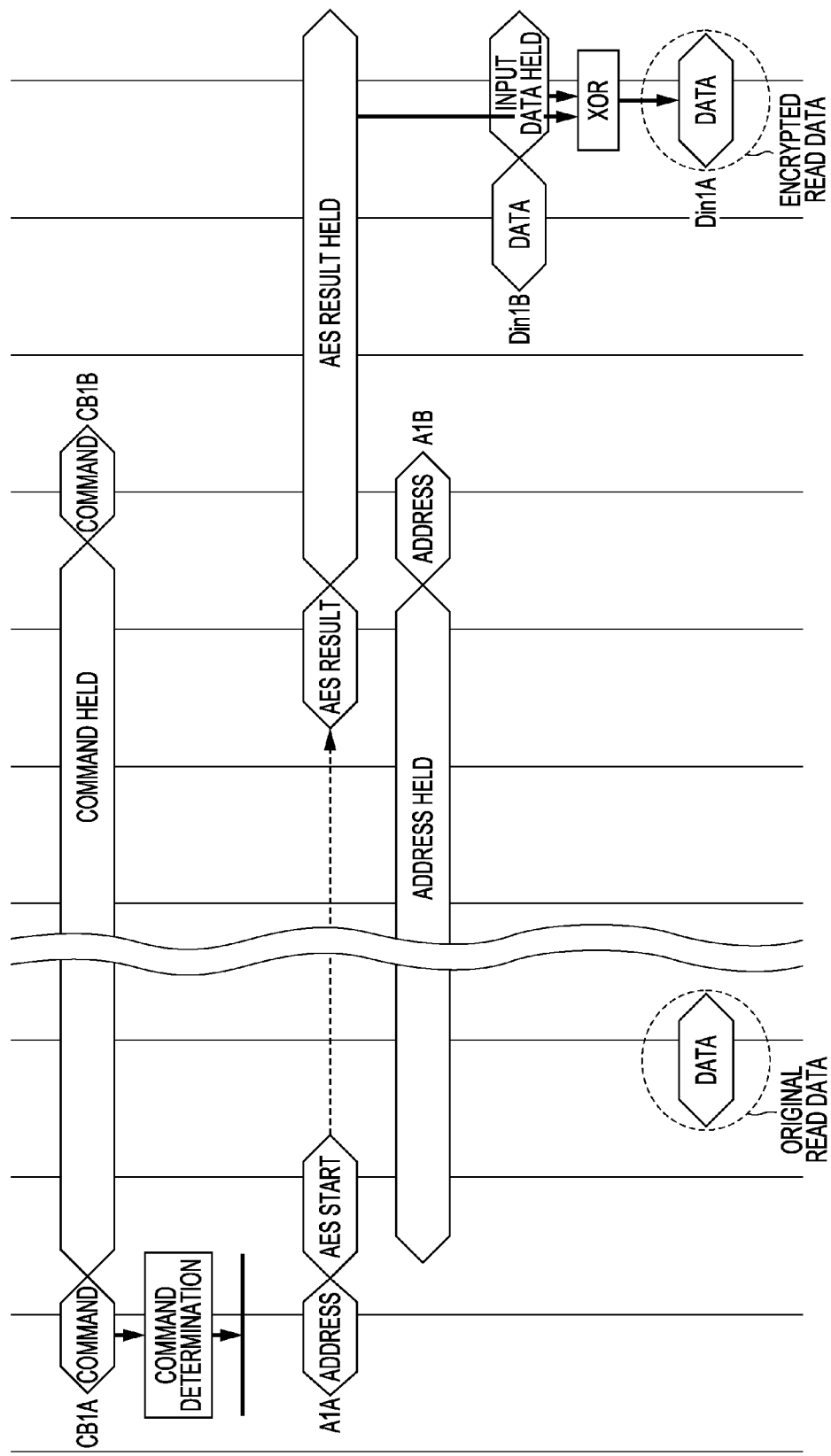
FIG. 7 illustrates an exemplary decryption.

FIG. 7 illustrates an exemplary decryption. The decryption illustrated in FIG. 7 may be performed by the encryption/decryption circuit illustrated in FIG. 5. The decryption illustrated in FIG. 7 may be performed in a memory read operation. A vertical line indicates an operation cycle. The bus control circuit BCT holds the command CB1A and determines the command as a read command. The address holding register RDA holds the address A1A based on an address latch signal and inputs the address A1A into the common key encryption control unit CEC. The address holding register RDA holds the address A1A until an AES result is obtained. The common key encryption control unit CEC performs encryption, for example AES processing, using the address A1A. When AES processing is completed, the bus control circuit BCT outputs a command and an address held by the bus control circuit BCT as the bus control signal CB1B and the address A1B respectively. A response to the read command is returned based on the output, and the input data holding register RID outputs a result of performing an XOR operation of the AES result held in the operation result holding register RES and Dout1B as Dout1A.

Figure 8:
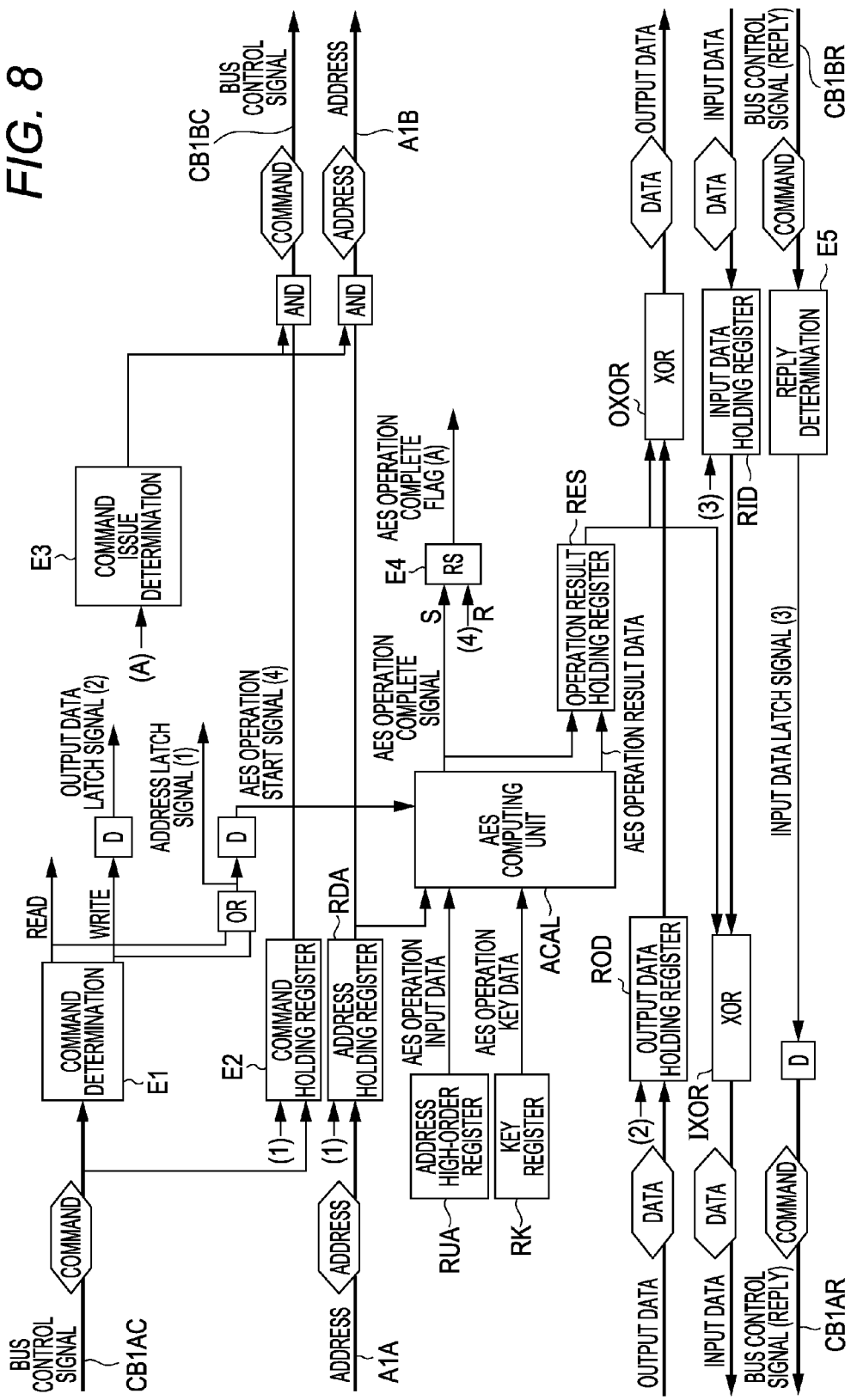
FIG. 8 illustrates an exemplary bus control circuit or an exemplary common key encryption control unit.

FIG. 8 illustrates an exemplary bus control circuit or an exemplary common key encryption control unit. The bus control circuit or the common key encryption control unit illustrated in FIG. 8 may include the bus control circuit BCT or the common key encryption control unit CEC illustrated in FIG. 5. The bus control circuit or the common key encryption control unit illustrated in FIG. 8 may perform processing illustrated in FIG. 6 or FIG. 7. The bus control signal CB1A or CB1B is divided into a bus control signal CB1AC or CB1BC corresponding to a unit bus for each direction and a reply bus control signal CB1AR or CB1BR. The bus control circuit BCT includes a command determination unit E1, a D-type FF (Flip Flop) and an OR gate which are coupled to the command determination unit E1, a command holding register E2, a command issue determination unit E3, an AND gate which is coupled to the command issue determination unit E3, a reply determination unit E5, and a D-type FF which is coupled to the reply determination unit E5. The common key encryption control unit CEC and the AES computing unit ACAL include the D-type FF coupled to the OR gate, the AES computing unit ACAL, and an AES operation complete register E4.

When the bus control signal CB1AC is input, the command determination unit E1 and an accompanying circuit determine whether a command is a read command or a write command and generate an address latch signal (1) obtained by performing an OR operation of the read command or write command. The command determination unit E1 and the accompanying circuit generate an output data latch signal (2) based on the determination of the write command. The D-type FF coupled to the OR gate generates also a common key (AES) operation start signal (4). The command may be held in the command holding register E2 and may be output as the bus control signal CB1BC.

The AES computing unit ACAL captures the counter value, RUA or RDA, and the cryptographic key RK based on the AES operation start signal to perform an operation. After the operation is completed, the AES computing unit ACAL outputs an operation complete signal together with operation data. The operation data is held in the operation result holding register RES based on the operation complete signal, and the AES operation complete register E4 is set. The AES operation complete register E4 outputs an AES operation complete flag (A). The command issue determination unit E3 is activated in accordance with the AES operation complete flag (A) to output data held in the command holding register E2 or the address holding register RDA as the bus control signal CB1BC or the address A1B.

After the command or address is output, data obtained by performing an XOR operation on the RES output and the value in the output data holding register ROD is output in a data write operation. When data is read, the reply determination unit E5 outputs an input data latch signal (3) based on the reply bus control signal CB1BR. The input data holding register RID holds input data based on the input data latch signal (3) and outputs data obtained by performing an XOR operation on the input data and the RES output as Din1A.

In the previous embodiment, the write operation and the read operation may be delayed by a time for processing of the common key.

Figure 9:
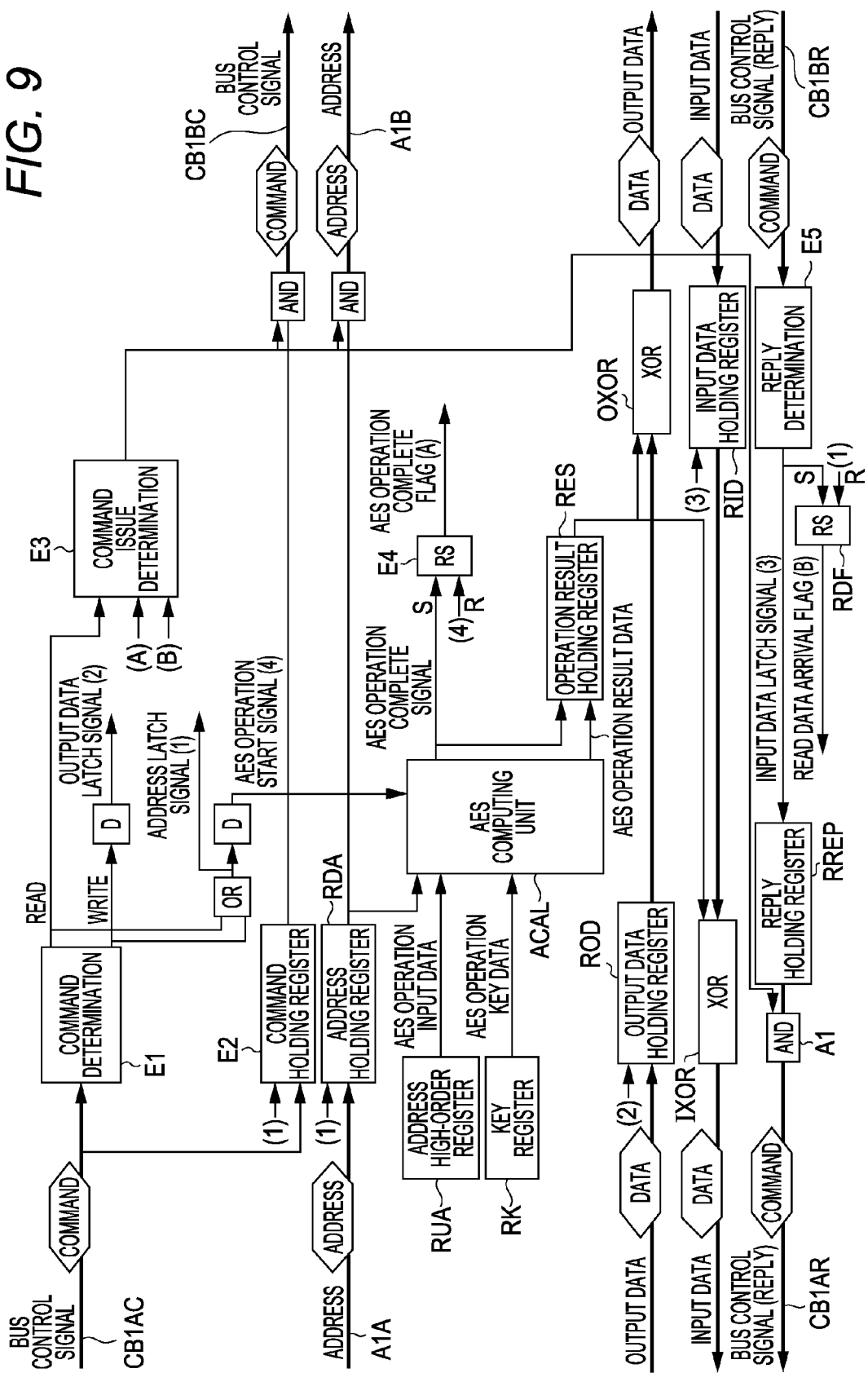
FIG. 9 illustrates an exemplary encryption/decryption circuit.
Figure 10:
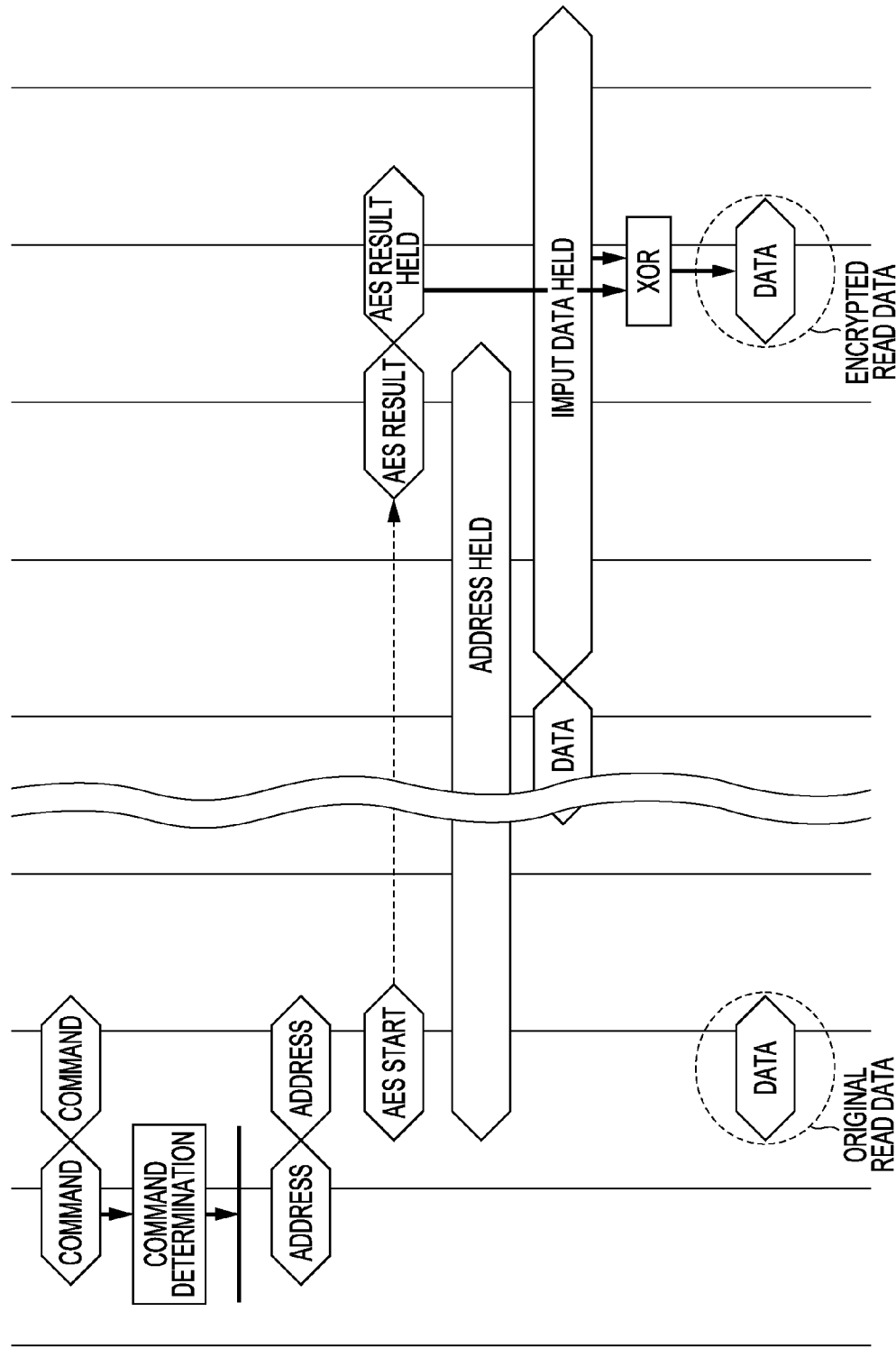
FIG. 10 illustrates an exemplary read operation.

FIG. 9 illustrates an exemplary encryption/decryption circuit. The encryption/decryption circuit illustrated in FIG. 9 may correspond to the encryption/decryption circuit illustrated in FIG. 8. FIG. 10 illustrates an exemplary read operation. The read operation illustrated in FIG. 10 may be performed by the encryption/decryption circuit illustrated in FIG. 9.

The encryption/decryption circuit illustrated in FIG. 9 includes a read data arrival flag RDF and an AND gate A1 for controlling output of a reply holding register RREP. The command issue determination unit E3 may be different from a command issue determination unit of the processor illustrated in FIG. 3. Other elements may be substantially the same as or similar to those illustrated in FIG. 3

A read command is issued in advance with the start of common key processing. The command issue determination unit E3 receives a read command determination signal from the command determination unit E1 and, if the command is a read command, issues the bus control signal CB1B to the memory controller 16 without waiting for completion of encryption, for example AES processing. The read access time and AES processing time may be different depending on memory settings and performance. The read data arrival flag RDF detects completion of read access and outputs a read data arrival flag (B). The command issue determination unit E3 controls the AND gate A1 based on the read data arrival flag (B) and an end signal (A) of common key processing. The AND gate A1 outputs output of the reply holding register RREP as the reply bus control signal CB1AR. An XOR operation of output of the input data holding register RID and output of the common key operation result holding register RES is performed and a result of the operation is output as Din1A.

In the previous embodiment, memory read access starts after encryption is completed. Since read data read from the external memory uses an encryption result, memory read access is not related to encryption. Thus, in other embodiments, encryption and memory read access are performed in parallel to reduce the processing time. The processing time may converge to the memory read access time or the encryption time.

Figure 11:
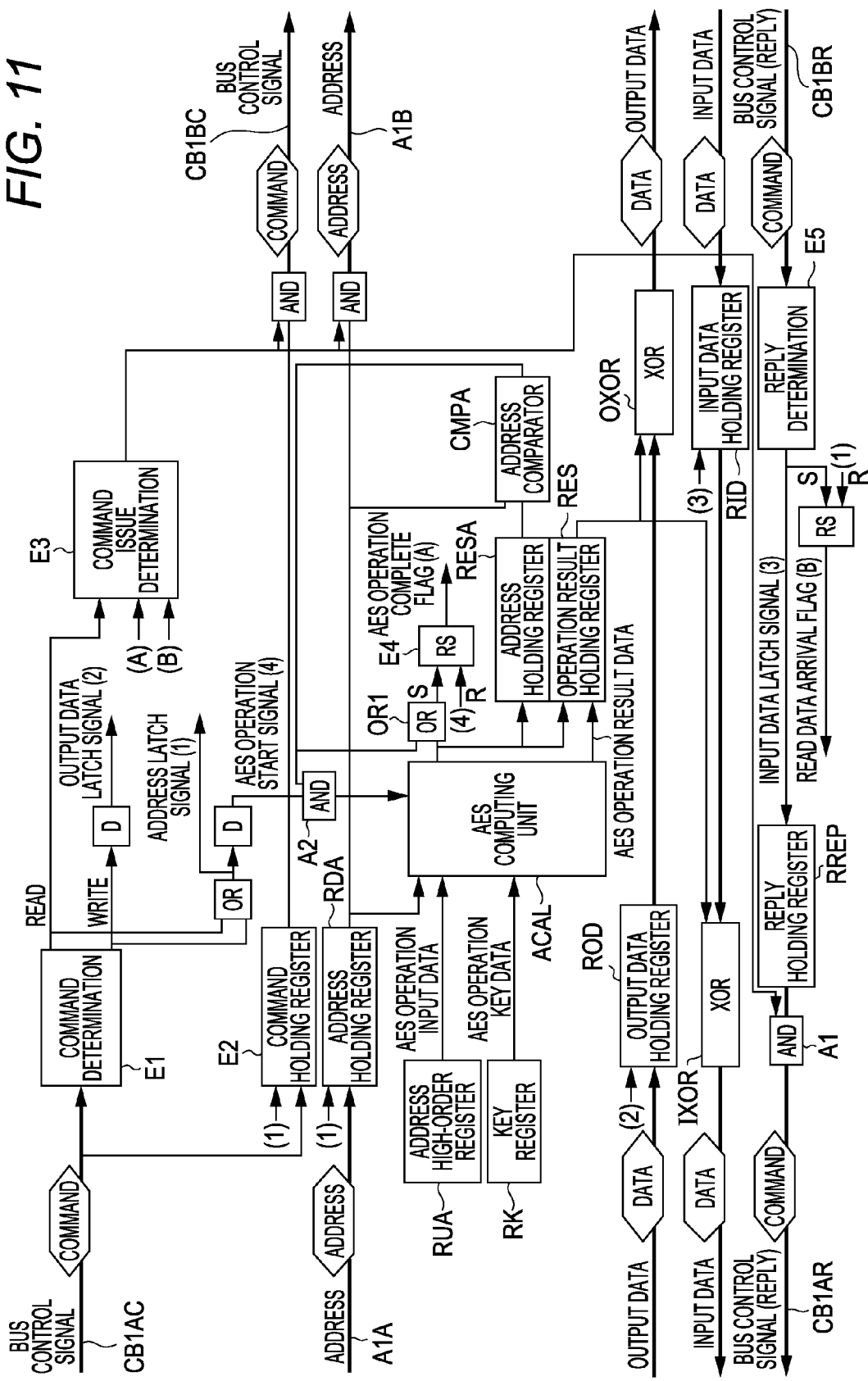
FIG. 11 illustrates an exemplary encryption/decryption circuit.
Figure 12:
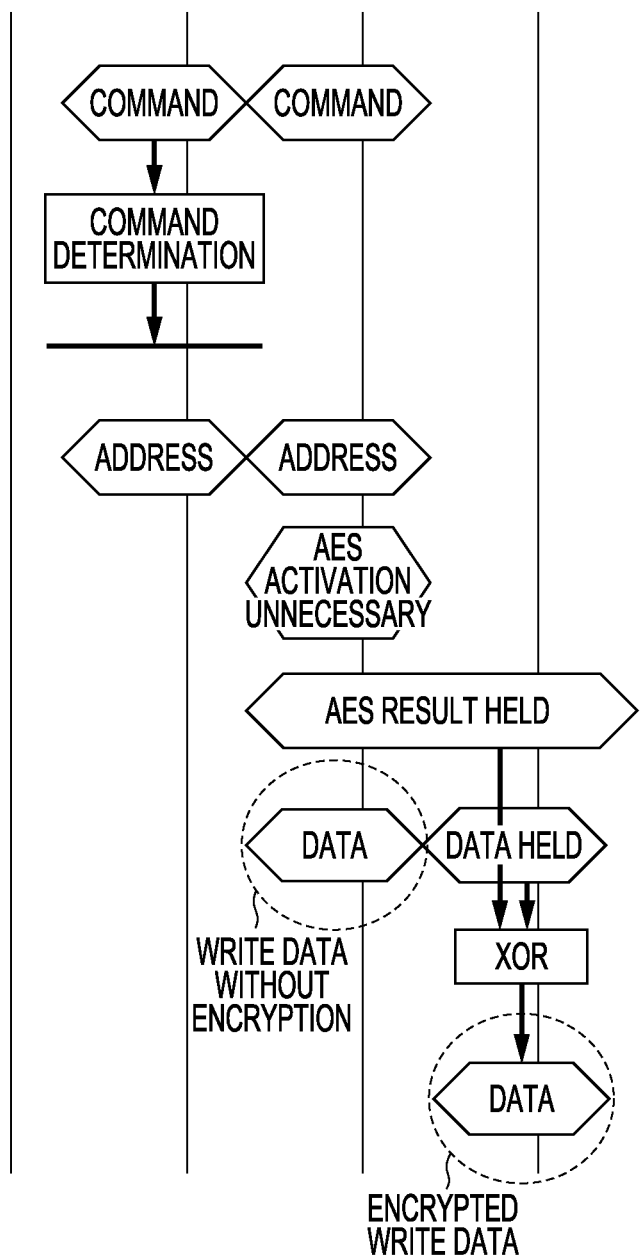
FIG. 12 illustrates an exemplary write operation.
Figure 13:
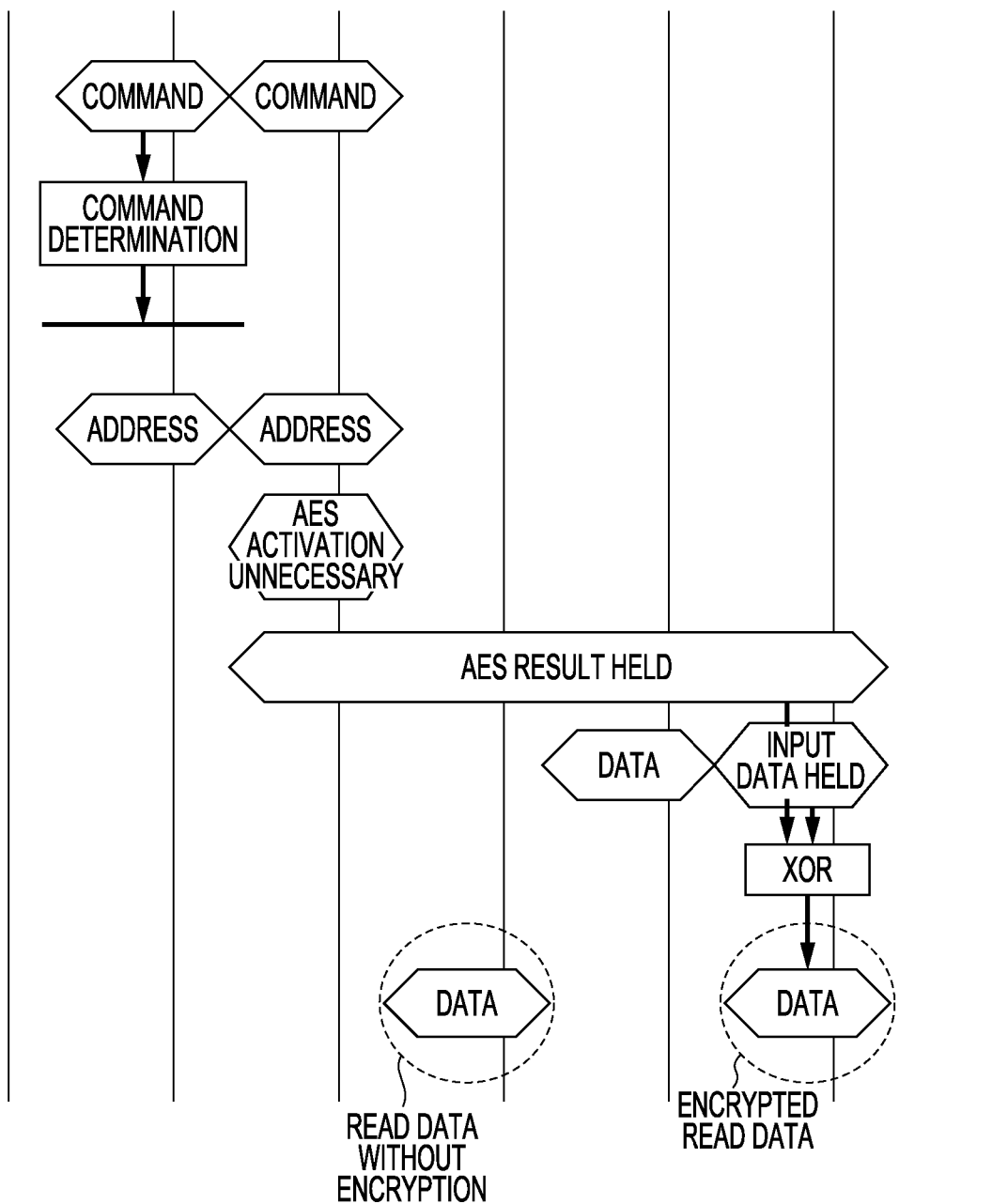
FIG. 13 illustrates an exemplary read operation.

FIG. 11 illustrates an exemplary encryption/decryption circuit. The encryption/decryption circuit illustrated in FIG. 11 may correspond to the encryption/decryption circuit illustrated in FIG. 8 or FIG. 9. FIG. 12 illustrates an exemplary write operation. The write operation illustrated in FIG. 12 may be performed by the encryption/decryption circuit illustrated in FIG. 11. FIG. 13 illustrates an exemplary read operation. The read operation illustrated in FIG. 13 may be performed by the encryption/decryption circuit illustrated in FIG. 11

The processor illustrated in FIG. 11 includes an address holding register RESA, an address comparator CMPA, an AND gate A2, and an OR gate OR1. Other elements may be substantially the same as or similar to those of the encryption/decryption circuit illustrated in FIG. 9.

The address holding register RESA holds an address that is a factor in the activation of the operation for generating an operation result held in the operation result holding register RES. The address comparator CMPA compares the address of a command and an address held in the address holding register RESA. The address comparator CMPA determines whether the operation result held in the operation result holding register RES may be used based on the comparison. If the operation result is used, the AND gate A2 masks the AES operation start signal (4) based on the output of the address comparator CMPA. If the operation result is used, the OR gate OR1 generates a set signal of the operation complete flag E4 based on output of the address comparator CMPA. The operation complete flag E4 outputs the AES operation complete flag (A) indicating that the operation is complete based on the set signal, for example no operation is necessary.

If the address of a command matches the address held in the address holding register RESA, an encryption operation will not be activated. The write operation illustrated in FIG. 12 may be increased by one cycle when compared with a case of no encryption to indicate an operation complete state. The read operation illustrated in FIG. 13 may be increased by two cycles. In the read and write operations, the number of cycles may be reduced. Since the program access unit of a processor, for example, 1 to 4 bytes is smaller than the encryption block unit of a common key, for example, 16 to 32 bytes, the number of times of operation activation of a common key may be reduced to about ¼ to ¹⁄₃₂.

Figure 14:
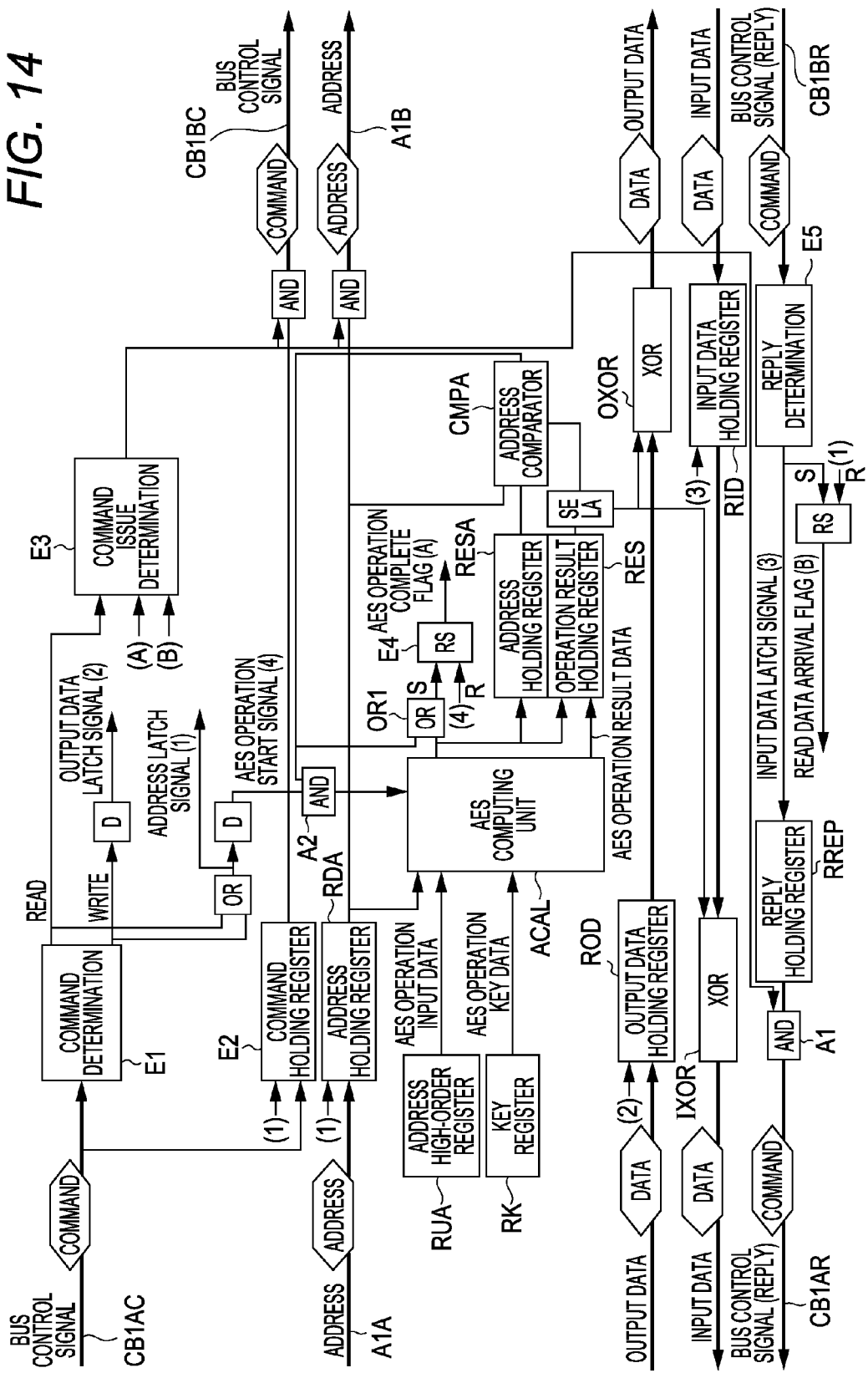
FIG. 14 illustrates an exemplary encryption/decryption circuit.

FIG. 14 illustrates an exemplary encryption/decryption circuit.

The encryption/decryption circuit illustrated in FIG. 14 includes a plurality of address holding registers RESA, a plurality of operation result holding registers RES, and a selector SELA. Other elements may be substantially the same as or similar to those illustrated in FIG. 14. The selector SELA selects an output of one operation result holding register RES from the plurality of operation result holding registers RES based on output of the address comparator CMPA.

Since the plurality of address holding registers RESA and the plurality of operation result holding registers RES are provided, the probability that the address of a command is held by RESA increases. This may lead to a decreased amount of operation and faster processing.

The plurality of address holding registers RESA and the plurality of operation result holding registers RES may be accessed from other portions of a processor. An operation result is written in advance and therefore, the number of times of encryption may be reduced when encryption target addresses are limited.

Example embodiments of the present invention have now been described in accordance with the above advantages. It will be appreciated that these examples are merely illustrative of the invention. Many variations and modifications will be apparent to those skilled in the art.

The invention claimed is:

1. A device comprising:
a processor that includes a bus module which inputs or outputs a data signal and outputs a command signal and an address signal; and
an encryption circuit that encrypts or decrypts the data signal in an encryption method using a common key and the address signal,
wherein the processor and the encryption circuit are provided in a chip,
wherein the encryption circuit includes a command determination circuit and a command issue determination unit, the command determination circuit detecting whether the command signal is a read command or a write command so that the encryption circuit starts an encryption operation based on a detection result of the command determination circuit, the command issue determination unit outputting, based on a complete signal indicating a completion of the encryption operation, a signal to output the command signal and the address signal from the encryption circuit.

2. The device according to claim 1, wherein the encryption circuit includes:
a common key encryption circuit that performs common key encryption based on the common key and the address signal; and
an encryption/decryption circuit that encrypts output data and decrypts input data by processing a result of the common key encryption and one of the output data and the input data.

3. The device according to claim 1, wherein the address signal is output when the command signal is the read command, and the address signal and encrypted write data are output after encryption by the common key encryption circuit is completed when the command signal is the write command.

4. The device according to claim 3, wherein the encryption circuit includes a read data arrival detection circuit that detects read data input in response to the address signal which is output when the command signal is the read command, and the encrypted read data is output after the read data is detected and the encryption of the common key encryption circuit is completed.

5. The device according to claim 2, wherein the encryption circuit includes:
a result holding register that holds a result of the common key encryption;
an address register that holds an address of the command signal for the common key encryption; and
a comparator that determines whether the address of the command signal is the address held in the address register,
wherein, when the address of the command signal is the address held in the address register, the result of the common key encryption held in the result holding register is used without performing the common key encryption.

6. The device according to claim 5, wherein the processor sets values to the result holding register and the address register.

7. A device comprising:
a processor that includes a bus module which inputs or outputs a data signal and outputs a command signal and an address signal; and
an encryption circuit that encrypts or decrypts the data signal in an encryption method using a common key and the address signal, and is provided in a chip on which the processor is mounted, wherein the encryption circuit includes:
a common key encryption circuit that performs common key encryption based on the common key and the address signal;
an encryption/decryption circuit that encrypts data which is output and decrypts data which is input by processing a result of the common key encryption and one of the data which is output and the data which is input;
a plurality of result holding registers that holds the results of the common key encryption;
a plurality of address registers, each of which holds an address of the command signal for the common key encryption and is provided for each of the plurality of result holding registers; and
a comparator that determines whether the address of the command signal is the address held in one of the plurality of address registers.

8. The device according to claim 7, comprising: a selector that selects one result holding register from the plurality of result holding registers based on a determination result of the comparator.

9. The device according to claim 7, wherein, when the address of the command signal is the address held in one of the plurality of address registers, the result of the common key encryption held in the result holding register corresponding to the one address register is used without performing the common key encryption.

10. The device according to claim 7, wherein the encryption circuit includes: a command determination circuit that detects whether the command signal is a read command or a write command, wherein the address signal is output when the command signal is a read command, and the address signal and encrypted write data are output after encryption by the common key encryption circuit is completed when the command signal is a write command.

11. The device according to claim 7, wherein the encryption circuit includes: a read data arrival detection circuit that detects read data input in response to the address signal which is output when the command signal is the read command, wherein the encrypted read data is output after the read data is detected and the encryption of the common key processing circuit is completed.

12. The device according to claim 1, wherein an encryption start signal to instruct the encryption circuit to start the encryption operation is generated based on a detection result of the command determination circuit.

* * * * *